(12) United States Patent
Campbell et al.

(10) Patent No.: US 6,469,629 B1
(45) Date of Patent: Oct. 22, 2002

(54) DISTRIBUTED LOGIC IN MULTIPLE PROTECTIVE RELAYS

(75) Inventors: Colin Bruce Campbell, Ajax; Roger Moore, Toronto; Andrew W. Baigent, Toronto, all of (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/249,551

(22) Filed: Feb. 12, 1999

(51) Int. Cl.$^7$ .............................................. G08B 21/00
(52) U.S. Cl. ...................... 340/635; 340/638; 340/639; 340/644; 361/62; 361/64; 361/68; 361/69; 361/66; 361/80; 361/81; 702/58; 702/60; 702/62; 702/64
(58) Field of Search .................................. 340/635, 638, 340/639, 644, 646, 650, 651, 652, 653; 361/62–64, 80, 81, 66, 65, 67, 68; 702/57, 58, 59, 60, 61, 62, 64, 65; 714/799

(56) References Cited

U.S. PATENT DOCUMENTS

| | | | |
|---|---|---|---|
| 5,793,750 A | | 8/1998 | Schweitzer, III et al. ... 370/242 |
| 5,809,045 A | * | 9/1998 | Adamiak et al. ............. 371/48 |
| 5,838,525 A | * | 11/1998 | Ward et al. .................... 361/69 |
| 5,922,034 A | * | 7/1999 | Feely .......................... 701/19 |
| 5,926,089 A | * | 7/1999 | Sekiguchi et al. .......... 340/500 |
| 6,198,402 B1 | * | 3/2001 | Hasegawa et al. .......... 340/635 |
| 6,259,978 B1 | * | 7/2001 | Feely .......................... 701/19 |
| 6,369,996 B1 | * | 4/2002 | Bo .............................. 361/80 |
| 6,373,670 B1 | * | 4/2002 | Bo .............................. 361/81 |
| 6,385,022 B1 | * | 5/2002 | Kulidjian et al. ............. 361/62 |

FOREIGN PATENT DOCUMENTS

DE  19722898 A  12/1998

OTHER PUBLICATIONS

XP 000923430, Stuart H. Borlase, "Advancing to True Station and Distribution System Integration in Electric Utilities", Jan. 1998, vol. 13 No. 1, pp. 129–134.
XP 000923431, Alexander Apostolov et al., "Network Interface Modules for Microprocessor Relays Integration Into A Substation Automation System", 1997, pp. 309–312.
"Introduction to UCA Version 2.0", Electric Power Research Institute, Mar. 15, 1997.

* cited by examiner

Primary Examiner—Benjamin C. Lee
(74) Attorney, Agent, or Firm—Karl Vick; Kevin Duncan; Hunton & Williams

(57) ABSTRACT

A protective relay, system, and relay operation method which allows logic functions to be distributed amongst multiple protective relays associated with a power distribution system. The protective relays include communications ports for exchanging messages over a peer-to-peer communications network, and include programmable logic. Each protective relay receives logic operands contained in the messages from remote protective relays, executes logic equations using the received operands, provides protective control if needed, and outputs operands to other protective relays.

18 Claims, 9 Drawing Sheets

FIG. 2

| Inputs | Input is "1" (= ON) if... |
|---|---|
| Element Pickup (PKP) | The tested parameter is presently above the pickup setting of an element which responds to rising values or below the pickup setting of an element which responds to falling values. |
| Element Operate (OP) | The tested parameter has been above/below the pickup setting of the element for the programmed time delay. |
| Contact Inputs | The logic input contact is presently in the programmed ON state. |
| Virtual Inputs | The virtual input is presently in the ON state. |
| Virtual Outputs | The virtual output flag is presently in the set state (i.e. evaluation of the logic equation results in a "1"). |
| Active Setting Group | The designated setting group is presently active. |

FIG. 3A

| OperandType | Operand Syntax | |
|---|---|---|
| Element State | ANY ELEMENT PKP | "Any Element" is all those listed in this table |
| | ANY ELEMENT OP | "Any Element" is all those listed in this table |
| | PHASE TOC1 PKP | At least one phase of TOC1 is picked up |
| | PHASE TOC1 OP | At least one phase of TOC1 is operated |
| | PHASE TOC1 PKP A | Phase A of TOC1 is picked up |
| | PHASE TOC1 PKP B | Phase B of TOC1 is picked up |
| | PHASE TOC1 PKP C | Phase C of TOC1 is picked up |
| | PHASE TOC1 OP A | Phase A of TOC1 is operated |
| | PHASE TOC1 OP B | Phase B of TOC1 is operated |
| | PHASE TOC1 OP C | Phase C of TOC1 is operated |
| | PHASE TOC2 | Same set of operands as shown for PHASE TOC1 |
| | PHASE IOC1 | Same set of operands as shown for PHASE TOC1 |
| | PHASE IOC2 | Same set of operands as shown for PHASE TOC1 |
| | NEUTRAL TOC1 PKP | Neutral TOC1 is picked up |
| | NEUTRAL TOC1 OP | Neutral TOC1 is operated |
| | NEUTRAL IOC1 | Same set of operands as shown for NEUTRAL TOC1 |
| | NEUTRAL IOC2 | Same set of operands as shown for NEUTRAL TOC1 |
| | GROUND TOC1 | Same set of operands as shown for NEUTRAL TOC1 |
| | GROUND IOC1 | Same set of operands as shown for NEUTRAL TOC1 |
| | GROUND IOC2 | Same set of operands as shown for NEUTRAL TOC1 |
| | SNS GROUND TOC1 | Same set of operands as shown for NEUTRAL TOC1 |
| | SNS GROUND IOC1 | Same set of operands as shown for NEUTRAL TOC1 |
| | SNS GROUND IOC2 | Same set of operands as shown for NEUTRAL TOC1 |
| | PHASE UV1 PKP | At least one phase of UV1 is picked up |
| | PHASE UV1 OP | At least one phase of UV1 is operated |
| | PHASE UV1 PKP A | Phase A of UV1 is picked up |
| | PHASE UV1 PKP B | Phase B of UV1 is picked up |
| | PHASE UV1 PKP C | Phase C of UV1 is picked up |
| | PHASE UV1 OP A | Phase A of UV1 is operated |
| | PHASE UV1 OP B | Phase B of UV1 is operated |
| | PHASE UV1 OP C | Phase C of UV1 is operated |
| | PHASE UV2 | Same set of operands as shown for PHASE UV1 |
| | DIG ELEM 1 PKP | Digital Element 1 is picked up |
| | DIG ELEM 1 OP | Digital Element 1 is operated |
| | DIG ELEM 1 DO | Digital Element 1 is dropped out |
| | DIG ELEM 16 PKP | Digital Element 16 is picked up |
| | DIG ELEM 16 OP | Digital Element 16 is operated |
| | DIG ELEM 16 DO | Digital Element 16 is dropped out |
| No Operation | Off | Logic = 0 Does nothing and may be used as delimeter in an equation list; used as ' Disable ' by other features. |

FIG. 3B

| Operand Type | Operand Syntex | |
|---|---|---|
| Operation | On | Logic = 1. Can be used as a test setting. |
| Contact Input | Cont Ip 1 On<br>Cont Ip 2 On<br>:<br>Cont Ip 1 Off<br>Cont Ip 2 Off<br>: | (will not appear unless ordered)<br>(will not appear unless ordered)<br><br>(will not appear unless ordered)<br>(will not appear unless ordered) |
| Virtual Input | Virt Ip 1 On<br>:<br>Virt Ip 32 On | |
| Virtual Output | Virt Op 1 On<br>:<br>Virt Op 64 On | |
| Contact Output (Voltage) | Cont Op 1 VOn<br>Cont Op 2 VOn<br>:<br>Cont Op 1 VOff<br>Cont Op 2 VOff<br>: | (will not appear unless ordered)<br>(will not appear unless ordered)<br><br>(will not appear unless ordered)<br>(will not appear unless ordered) |
| Contact Output (Current) | Cont Op 1 IOn<br>Cont Op 2 IOn<br>:<br>Cont Op 1 IOff<br>Cont Op 2 IOff<br>: | (will not appear unless ordered)<br>(will not appear unless ordered)<br><br>(will not appear unless ordered)<br>(will not appear unless ordered) |
| Counter | COUNTER 1 HI<br>COUNTER 1 EQL<br>COUNTER 1 LO<br>:<br>COUNTER 8 HI<br>COUNTER 8 EQL<br>COUNTER 8LO | Digital Counter 1 output is 'more than' comparison value<br>Digital Counter 1 output is 'equal to' comparison value<br>Digital Counter 1 output is 'less than' comparison value<br><br>Digital Counter 8 output is 'more than' comparison value<br>Digital Counter 8 output is 'equal to' comparison value<br>Digital Counter 8 output is 'less than' comparison value |
| Remote Input | Remote Ip 1 On<br>:<br>Remote Ip 32 On | |
| Active Setting Group | SETTING GRP 1 ACTIVE<br>:<br>SETTING GRP 8 ACTIVE | Setting group 1 is active<br><br>Setting group 8 is active |

FIG. 4

| Gates | Number of Inputs | Output is "1" (= On) if... |
|---|---|---|
| NOT | 1 | input is "0" |
| OR | 2 to 16 | any input is "1" |
| AND | 2 to 16 | all inputs are "1" |
| NOR | 2 to 16 | all inputs are "0" |
| NAND | 2 to 16 | any input is "0" |
| XOR | 2 | only one input is "1" |

FIG. 5

| Operator Type | Operator Syntax | Description |
|---|---|---|
| Editor | INSERT<br>DELETE | Used to insert a parameter in an equation list.<br>Used to delete a parameter from an equation list. |
| End | END | The first END encountered signifies the last entry in the list of FlexLogic™ parameters that is processed. |
| Logic Gate | NOT | Logical Not |
| | OR(2)<br>⋮<br>OR(16) | 2 Input Or gate<br>⋮<br>16 Input Or gate |
| | AND(2)<br>⋮<br>AND(16) | 2 Input And gate<br>⋮<br>16 Input And gate |
| | NOR(2)<br>⋮<br>NOR(16) | 2 Input Nor gate<br>⋮<br>16 Input Nor gate |
| | NAND(2)<br>⋮<br>NAND(16) | 2 Input Nand gate<br>⋮<br>16 Input Nand gate |
| | XOR(2) | 2 Input Exclusive Or gate |
| | LATCH (S.R) | Latch (Set, Reset) |
| Timer | TIMER 1<br>⋮<br>TIMER 32 | Timer as configured in FlexLogic™ Timers settings |
| Assign Virtual Output | = Virt Op 1.<br>⋮<br>= Virt Op 64. | Assigns previous parameter to a Virtual Output |

FIG. 10

| DNA | Definition | Intended Function | Logic 0 | Logic 1 |
|---|---|---|---|---|
| 1 | Oper Dev | | Trip | Close |
| 2 | Lock Out | | LockoutOff | LockoutOn |
| 3 | Initiate Reclosing | Initiate remote reclose sequence | InitRecloseOff | InitRecloseOn |
| 4 | Block Reclosing | Prevent/cancel remote reclose sequence | BlockOff | BlockOn |
| 5 | Breaker Failure Initiate | Initiate remote breaker failure scheme | BFIOff | BFIOn |
| 6 | Send Transfer Trip | Initiate remote trip operation | TxXfrTripOff | TxXfrTripOn |
| 7 | Receive Transfer Trip | Report receipt of remote tranfer trip command | RxXfrTripOff | RxXfrTripOn |
| 8 | Send Perm | Report permissive affirmative | TxPermOff | TxPermOn |
| 9 | Receive Perm | Report receipt of permissive affirmative | RxPermOff | RxPermOn |
| 10 | Stop Perm | Override permissive affirmative | StopPermOff | StopPermOn |
| 11 | Send Block | Report block affirmative | TxBlockOff | TxBlockOn |
| 12 | Receive Block | Report receipt of block affirmative | RxBlockOff | RxBlockOn |
| 13 | Stop Block | Override block affirmative | StopBlockOff | StopBlockOn |
| 14 | BkrDS | Report breaker disconnect 3-phase state | Open | Closed |
| 15 | BkrPhsADS | Report breaker disconnect phase A state | Open | Closed |
| 16 | BkrPhsBDS | Report breaker disconnect phase B state | Open | Closed |
| 17 | BkrPhsCDS | Report breaker disconnect phase C state | Open | Closed |
| 18 | DiscSwDS | | Open | Closed |
| 19 | Interlock DS | | DSLockOff | DSLockOn |
| 20 | LineEndOpen | Report line open at local end | Open | Closed |
| 21 | Status | Report operating status of local GOOSE device | Offline | Available |
| 22 | Event | | EventOff | EventOn |
| 23 | Fault Present | | FaultOff | FaultOn |
| 24 | Sustained Arc | Report sustained arc | SustArcOff | SustArcOn |
| 25 | Downed Conductor | Report downed conductor | DownedOff | DownedOn |
| 26 | Sync Closing | | SyncClsOff | SyncClsOn |
| 27 | Mode | Report mode status of local GOOSE device | Normal | Test |
| 28 | Reserved | | | |
| 29 | Reserved | | | |
| 30 | Reserved | | | |
| 31 | Reserved | | | |
| 32 | Reserved | | | |

DISTRIBUTED LOGIC IN MULTIPLE PROTECTIVE RELAYS

BACKGROUND OF THE INVENTION

The present invention relates generally to digital protective relays for electrical distribution systems. More particularly, the present invention relates to a digital protective relay and system for providing enhanced protection and monitoring functions to an electrical distribution system.

Digital protective relays are well-known for monitoring and providing protective control of electrical power distribution systems. As used herein, the term "electrical power distribution system" includes systems, and components of systems, for the generation, transmission, and/or distribution of electrical power to customers. Such relays are typically connected to a point on the electrical distribution system, monitor current, voltage, or other parameters, and provide protective control (e.g., by providing a control signal to cause power to be removed from the portion of the system with which the relay is associated) in the event that certain specified conditions occur. The functions of the protective relays can be enhanced in many ways. For example, digital protective relays include a microprocessor, which allows a user to determine how the protective relay will react under certain conditions.

Traditionally, protective relay logic has been relatively limited. Any unusual applications involving interlocks, blocking, or supervisory functions are typically achieved by hardwiring contact inputs and outputs. This requirement for auxiliary components and wiring make many logic schemes extremely difficult to implement.

Flexible logic schemes are known which allow a user to program logic functions within an individual relay. Such a relay typically includes fixed logic, which implements pre-determined functions, and variable logic, which is controllable by the user to implement additional functions. In general, the relay incorporating programmable logic receives analog and digital inputs and uses these inputs to produce analog and digital outputs. If a relatively simple scheme is desired, where a contact input is used to block a measuring element of the relay, this selection is made when programming the measuring element. More complex logic schemes can be programmed in the individual relay. For example, if it is desired to have the closed state of one contact input and the operated state of a phase undervoltage element block the operation of a phase time overcurrent element, a logic equation is programmed to AND the two inputs to produce a virtual output, which is then selected when programming the phase time overcurrent element to be used as a blocking input.

While known programmable logic in a protective relay advantageously minimizes the requirement for auxiliary components and wiring, and makes more complex logic schemes possible, there are still limitations, as there are typically many protective relays operatively associated with an electrical distribution system.

It is known to communicate between protective relays. For example, U.S. Pat. No. 5,838,525 discloses high-speed single-pole trip logic for use in protective relays. The disclosed system includes a remote protective relay which generates a pilot signal to indicate the detection of a fault, and communicates the pilot signal to a local protective relay associated with a different location on an electrical line. The local protective relay uses the received pilot signal to supervise single-pole trip operations.

More complex communication schemes are also known. For example, the Electric Power Research Institute (EPRI) has specified a communication standard known as the UCA 2.0 "Generic Object Oriented Substation Event" (GOOSE) specification. GOOSE is based on the asynchronous reporting of a relay's digital output status to other peer devices on a network. GOOSE messages are designed to be short, high priority, and communicated with a high level of reliability. To achieve reliability, GOOSE messages are repeated as long as they are valid. GOOSE messages need not be acknowledged and so may be multicast. The GOOSE message structure contains space for 128 bit pairs representing digital point state information. The GOOSE specification provides 32 "DNA" bit pairs, which are status bits representing pre-defined events. All remaining bit pairs are "UserSt" bit pairs, which are status bits representing user-defined events. The UCA 2.0 specification includes features that are used to cope with the loss of communication between transmitting and receiving devices. Each transmitting device sends a GOOSE message upon a successful powerup, when the state of any included point changes, or after a specified interval (a "default update" time) if a change of state has not occurred. The transmitting device also sends a "hold time" which is set to three times the programmed default time.

Where protective relays are provided with communications capabilities, control logic is typically predefined, pre-programmed, or involves establishing a master-slave relationship between communicating protective devices. Implementing control logic can also require relatively complex wiring schemes between relays. Such protective relays and schemes are undesirable in that they limit or make it difficult to provide a wide variety of protection schemes.

It would be desirable for a protective relay to incorporate programmable control logic, and also to be able to communicate outputs of the programmable control logic to remote protective relays associated with the same electrical distribution system, in order to provide enhanced protection and control. It would also be desirable to provide enhanced control and configuration options for providing enhanced protective control of electrical distribution systems, and to be able to implement more complex logic schemes than are possible by programming logic in each individual protective relay associated with a network. However, known protective relays and protection schemes are unsatisfactory for this purpose.

SUMMARY OF THE INVENTION

The present invention overcomes the disadvantages of prior solutions, and achieves additional advantages, by providing for a power control and monitoring system for an electrical power distribution network which includes a plurality of digital protective relays which include programmable logic and which can communicate control logic inputs and outputs over a peer-to-peer communications network. Each digital protective relay includes facilities, terminals, devices or equipment for connecting to an electrical distribution system and at least one communications port for connection to the peer-to-peer communications network. The peer-to-peer communications network is preferably an ethernet network.

BRIEF DESCRIPTION OF THE DRAWINGS

FIG. 2 is a table showing programmable logic characteristics in an implementation of the present invention;

FIG. 3 is a table of operands available in one implementation of the distributed logic of the present invention;

FIG. 4 is a table of gate characteristics for various known types of logic gates;

FIG. 5 is a table describing programmable logic operators according to an exemplary embodiment of the present invention;

FIG. 10 is a table defining the functions of various DNA bit pairs in one implementation of the present invention.

DETAILED DESCRIPTION

Figure 1:
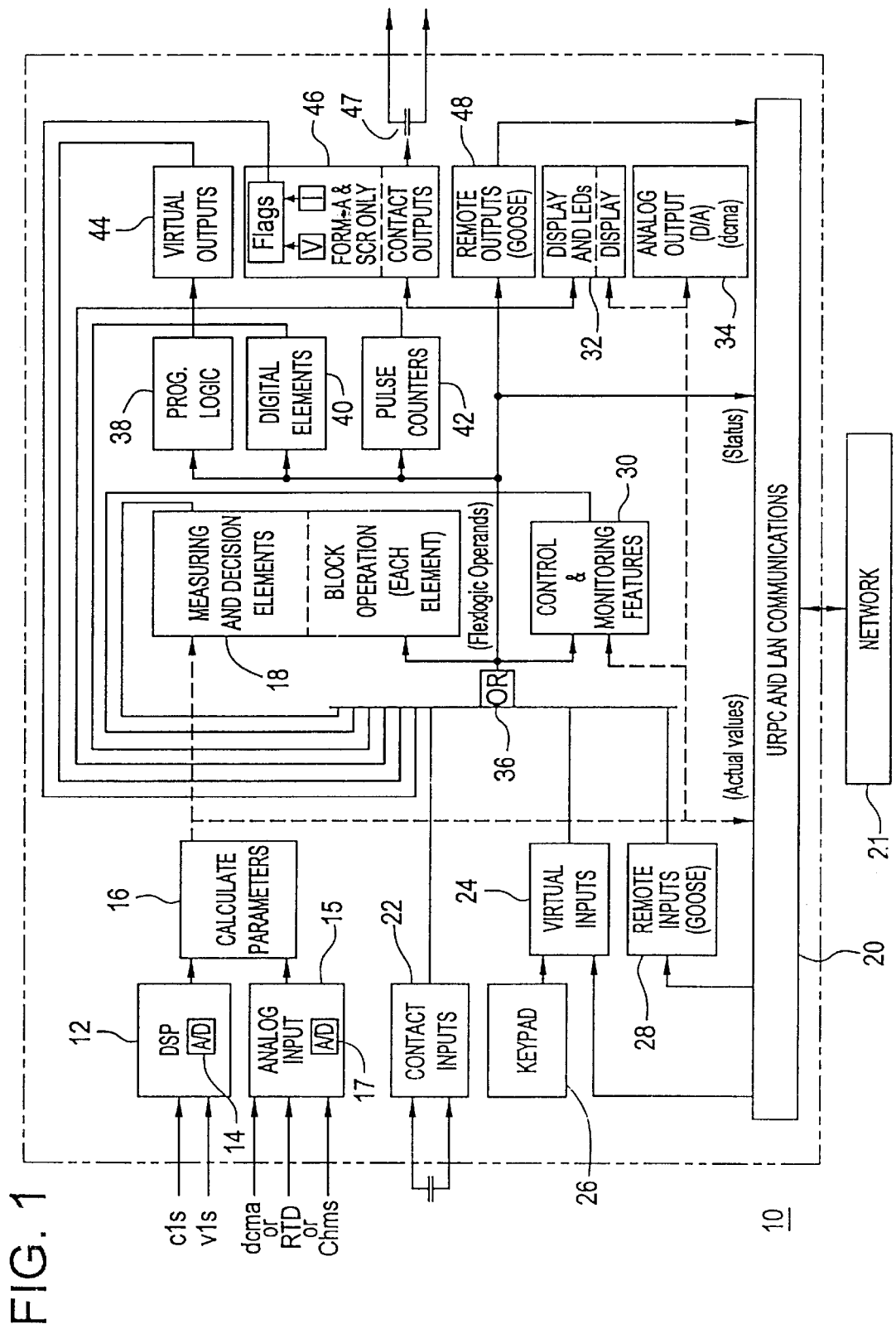
FIG. 1 is a diagram showing the functional blocks of a relay suitable for implementing the present invention.

FIG. 1 is a diagram showing the functional blocks of a relay suitable for implementing the present invention. The relay 10 includes a digital signal processor (DSP) 12, which is operatively associated with one or more current transformers CT and/or voltage transformers VT in a electrical distribution system or network. The DSP 12 receives analog inputs from the transformers and outputs an analog-to-digital (A/D) converter 14 which receives one or more of these analog inputs, such as current or voltages values, and outputs digital signals to a processor 16 which calculates any number of desired parameters, and outputs actual digital values of these parameters. The Analog Input 15 receives analog inputs and includes an analog-to-digital (A/D) converter 17 which receives one or more of these analog inputs, such as resistance or dcmA values, and outputs digital signals to a processor 16 which calculates any number of desired parameters, and outputs the actual values of these parameters. The digital outputs of the DSP 12 and Analog Input 15, and the calculated parameters, are input to a measuring block 18. The measuring block 18 outputs one or more flags indicative of the state of the measured parameters. The processor 16 further outputs the actual values of the calculated parameters through a communication port 20 to a communications network 21, to a control and monitoring block 30, to a display 32, and to a digital-to-analog (D/A) converter 34. In FIG. 1, it should be appreciated that the broken lines indicate that actual values are transmitted, and that solid lines indicate that status bits or flags are transmitted. Preferably, the communications network 21 is an ethernet LAN network, although it should be appreciated that any suitable communication network can be used. Communications network 21 preferably includes peer-to-peer communication capability, in which any one of a plurality of network devices can initiate communication with any other of the plurality of network devices.

The relay 10 further includes contact inputs 22 which are operatively connected to contacts 24. The contact inputs 22 outputs a flag indicative of the state of the contacts 24 (open, closed). The relay 10 further includes a virtual inputs block 24 which receives virtual inputs from a keypad 26, communications port 20, or other suitable input source. The virtual inputs block 24 outputs one or more flags indicative of the state of the virtual inputs. The relay 10 further includes a remote inputs block 28 which receives input via the communications port 20.

The status flags output by the measuring block 18, the contact inputs 22, the virtual inputs 24, and the remote inputs 28 are all provided to an OR gate 36. The OR gate 36 also receive status flag inputs from the control and monitoring block 30, a programmable logic equations block 38, a digital elements block 40, programmable logic counters 42, a virtual outputs block 44, and a contact outputs block 46 which operates a pair of contacts 47. The OR gate 36 outputs the logical OR of all of its inputs to the measuring block 18, programmable logic equations 38, digital elements 40, counters 42, remote outputs block 48, contact outputs 46, display 32, and the communications port 20. The remote outputs block 48 outputs message data (e.g., in the GOOSE format) to communications port 20.

The states of all of the digital signals in the relay of FIG. 1 are represented by flags or other suitable operands. In one implementation, a digital "1" is represented by a "set" flag. As shown in FIG. 1, a change of state in an external contact (contacts 24) can be used to block an element from operating, as an input to a control feature in a programmable logic equation, or can be used to operate contact output 46. The state of the contact input can be displayed locally in display 32, or viewed remotely via the communications network 21. If it is desired to implement a relatively simple scheme, where a contact input is used to block an element, this implementation is selected when programming the element.

The relay of FIG. 1 allows the implementation of more complex logic schemes via the programmable logic equations 38, digital elements 40, and counters 42. For example, if it is desired to have the closed state of the contacts 24 and the operated state of the phase undervoltage element block the operation of the phase time overcurrent element, the two input states are programmed in a logic equation in block 38. The equation in this example ANDs the two inputs to produce a virtual output (through block 44). This virtual output is then selected when programming the phase time overcurrent to be used as a blocking input. As shown in FIG. 1, virtual outputs in block 44 can be created only by the programmable logic equations 38.

The relay of FIG. 1 allows the logic that determines the interaction of inputs, elements, and outputs to be field programmable by using logic equations (e.g., in "postfix" notation) that are sequentially processed. The virtual inputs 24 and virtual outputs 44 can be used internally by the relay or through the communications port 20 by other relays which are connected to a master-slave communications network. The remote inputs 28 can be used internally by the relay, and remote outputs 48 can be used, through the communications port 20, by other relays which are connected to the peer-to-peer communications network. As will be described in more detail below, the ability for all the relays in the peer-to-peer communications network to exchange remote inputs and outputs enables the distributed programmable logic to be implemented. Thus, it should be appreciated that virtual inputs relate to master-slave relationships, and that remote inputs and outputs relate to peer-to-peer relationships between communications devices.

The programmable logic 38 of the relay of FIG. 1 allows a user to customize the relay through a series of equations which consist of operators and operands. The operands are the states of the inputs, elements, and outputs. The operators include logic gates, timers, and latches (which have set and reset inputs). Sequential operations allows any combination of specified operands to be assigned as inputs to specified operators to create an output. The final output of an equation is a numbered register (the virtual output 44). Virtual outputs 44 can be used as an input operand in any equation, including the equation which generates the output (e.g., as a seal-in or other type of feedback).

In the programmable logic of the relay of FIG. 1, operands have a logic state of 1 or 0. Operators provide a predefined function, such as an AND gate or timer. Each programmable logic equation defines the combination of parameters to be used to set a virtual output flag in element 44. Thus, evaluation of an equation results in either a 1 (on, flag set) or 0 (off, flag not set). Preferably, each programmable logic equation is evaluated at least 4 times per power cycle of the electrical distribution system.

FIG. 2 is a table showing programmable logic characteristics, that is, characteristics of different types of operands, according to one embodiment of the present invention. The inputs in this example are defined as an element pickup PKP, an element operate OP, contact inputs, virtual inputs, virtual outputs, and an active setting group. The element pickup PKP is logic "1", or ON, when the tested parameter is above the pickup setting of an element which responds to rising values or below the pickup setting of an element which responds to falling values. The element operate OP input is logic "1", or ON, when the tested parameter has been above or below, as appropriate, the pickup setting of the element for the programmed time delay. The contact inputs are logic "1" when the logic input contact is in the programmed ON state, and the virtual inputs are logic "1" when the virtual input is in the ON state. The virtual outputs are logic "1" when the virtual output flag is presently in the set state (i.e., evaluation of the programmable logic equation results in a logic "1"). The active setting group is a logic "1" when the group is active.

FIG. 3 is a table of operands available in one implementation of the distributed logic of the present invention. The table lists operand types, operand syntaxes, and operand definitions. It will of course be recognized that this is merely one implementation, and that other operands may used.

FIG. 4 is a table of gate characteristics for various known types of logic gates. It should be appreciated that while for this exemplary embodiment, the number of inputs for OR, AND, NOR, and NAND gates does not exceed 16, different embodiments may have different input limitations.

FIG. 5 is a table describing programmable logic operators according to an exemplary embodiment of the present invention. Each operator type includes one or more operator syntaxes, each of which is defined in the third column of the table. Again, it should be appreciated that other suitable operators can be defined by those of ordinary skill in the art for other implementations of the invention.

In one implementation of the present invention, the following rules apply for the programmable logic equations in block 38: 1) any contact input, virtual input or output, element operand, or logic gate operator, can be used any number of times; 2) timer operator and virtual output operand assignments can be used only once in an equation; 3) operands precede operators; 4) assigning the output of an operator to a virtual output terminates an equation; and 5) the 'END' parameter is placed after the last parameter used (which will be an assignment of a virtual output), to indicate that no further processing is required. With logic equations constructed according to these guidelines, each equation can be evaluated in the order in which the parameters have been entered.

Figure 6:
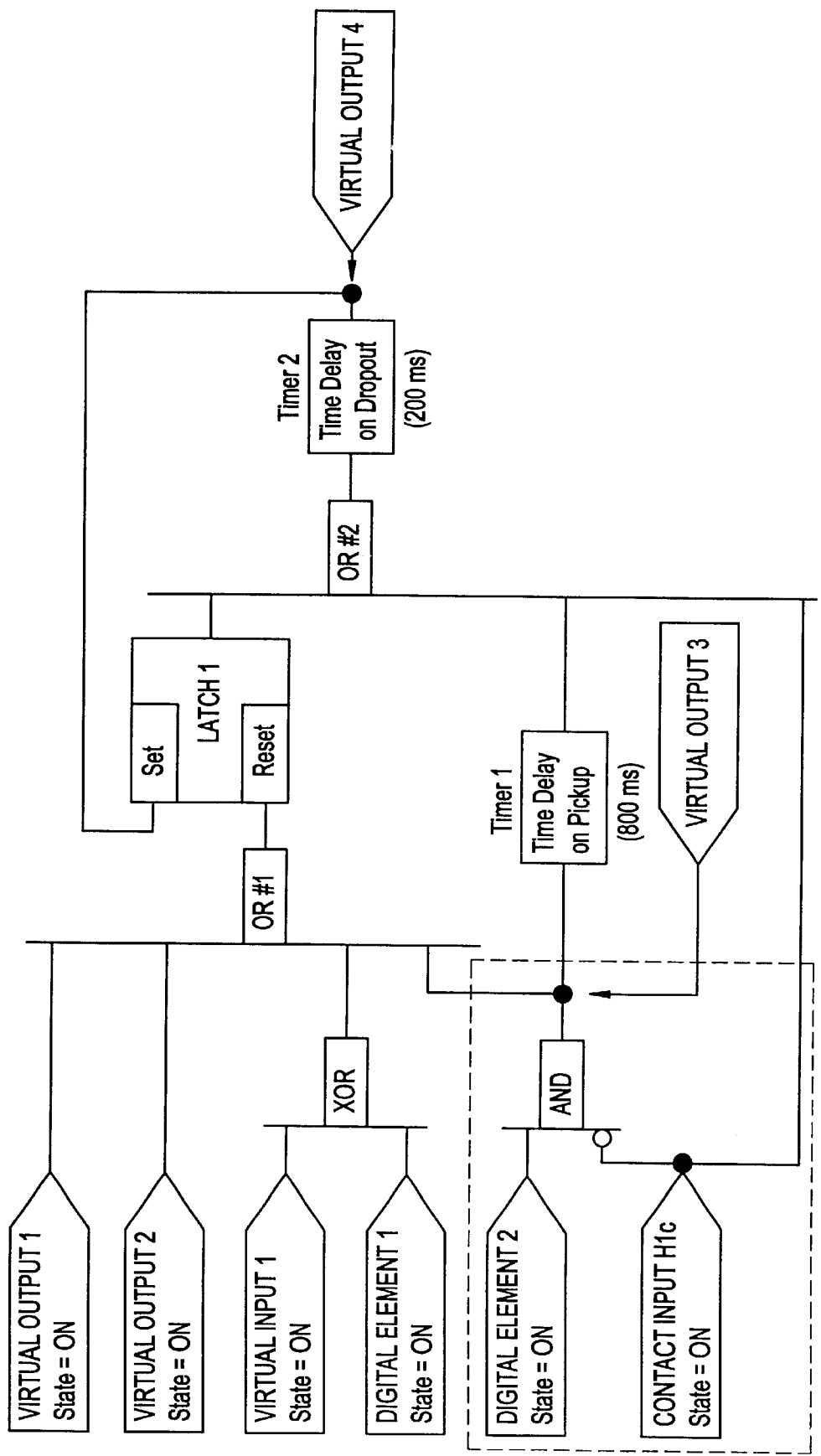
FIG. 6 defines a desired logic scheme to be implemented in the distributed logic of the present invention.
Figure 7:
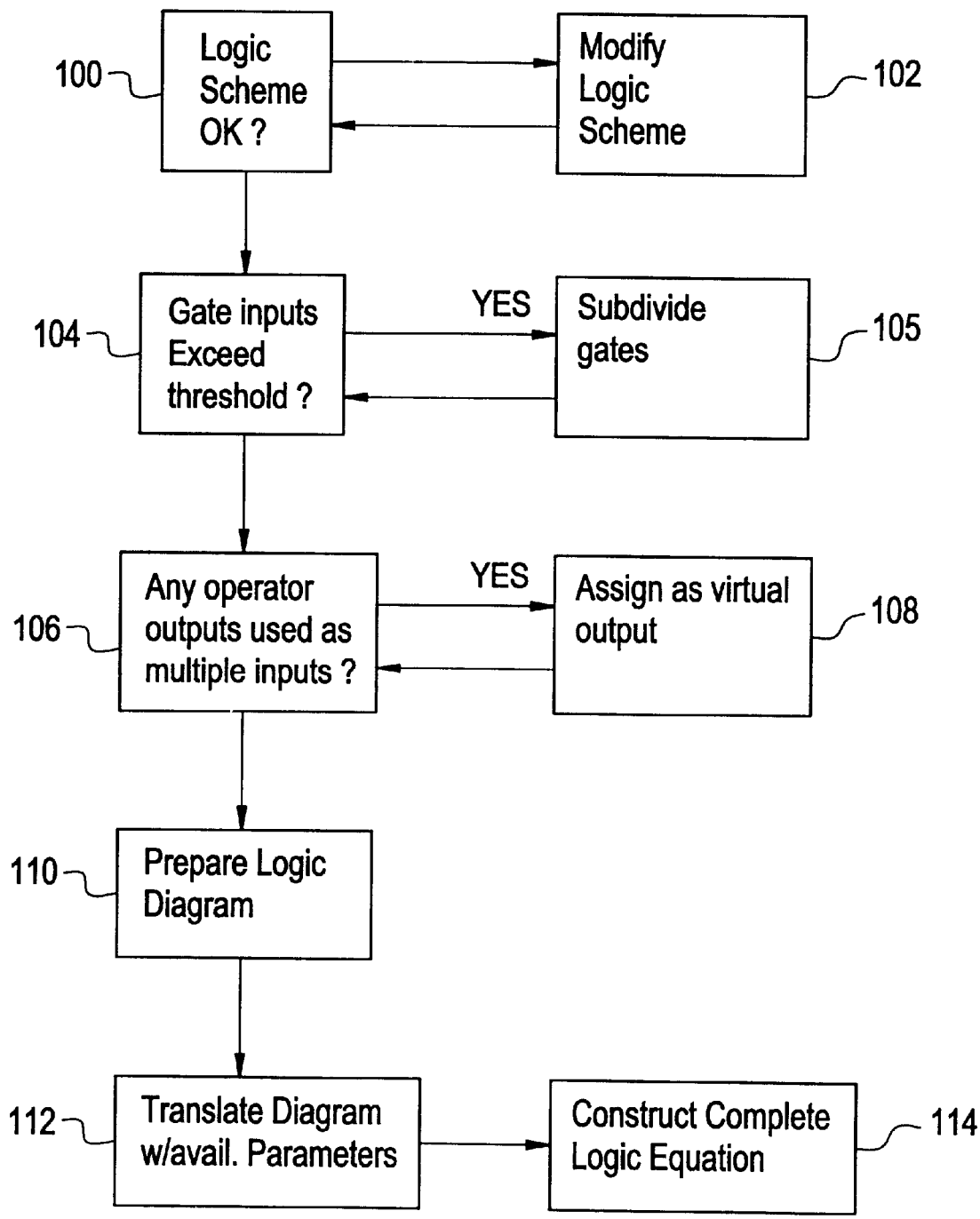
FIG. 7 is a flow chart describing a method for implementing a desired logic scheme.

With the operand characteristics, operands, logic gates, and operators defined, exemplary logic schemes will now be discussed with reference to FIG. 6. As one exemplary logic scheme, it is assumed that some logic has already been programmed to produce virtual outputs VO1 and VO2, incorporating state data brought from the other relay devices on the peer-to-peer communications network as remote inputs and that only a part of the full equation set is used. In this example, a virtual output designation (e.g., VO1-VO64) can be assigned only once. FIG. 6 defines a desired logic scheme, and FIG. 7 is a flow chart describing a method for implementing a desired logic scheme. It will be appreciated that the method implements postfix, or "reverse polish" notation, which simplifies the creation of a logic equation for a desired logic scheme. In the method, in step 100, a logic diagram of the proposed logic scheme is inspected to determine if the required logic can be implemented with the given set of operators in the programmable logic system. If this is not possible, the logic is altered in step 102 until this condition is satisfied. Once the condition is satisfied, in step 104, it is determined whether the number of inputs for each gate does not exceed predetermined limits. If the number of inputs is too high, the inputs are subdivided into multiple gates to produce an equivalent logic result. For example, if it is desired to have 25 inputs to an AND gate, one AND gate can receive 16 inputs, a second AND gate can receive 9 inputs, and the outputs of both AND gates can be ANDed together to produce an equivalent logic result. In step 106, each operator between the initial operands and the final virtual outputs is inspected to determine if the output from the operator is used as an input to more than one following operator. If so, the output of this operator is assigned as a virtual output in step 108. In the example shown in FIG. 6, the output of the AND gate is used as an input to both OR1 and Timer1, and is therefore made to be a virtual output and assigned a virtual output number (e.g., VO3). The final output must also be assigned a virtual output number (e.g., VO4), which will be programmed in the contact output block 46 (see FIG. 1) to operate relay H1 The foregoing steps 100–108 provide a method for determining whether the desired logic can be implemented.

In step 110, a logic diagram is prepared for the equation necessary to produce the virtual outputs. In the example of FIG. 6, since the virtual output VO3 is an operand in the equation for virtual output VO4, VO3 should be determined first, as should any virtual output which is to be used as an operand. For later virtual outputs (i.e., virtual outputs relying on a previous virtual output as an operand), the logic diagram for the later virtual output should replace the logic diagram for the previous virtual output with the previous virtual output's number (e.g., VO3). In step 112, the programmable logic equation is programmed by translating the logic diagrams into the available logic parameters in FIGS. 2–5. The equation is formed one parameter at a time, until the required logic is complete. It should be appreciated that it is generally easier to start at the output end of the equation and work backward toward the input, and that it is generally easier to list operator inputs from bottom to top.

Figure 8:
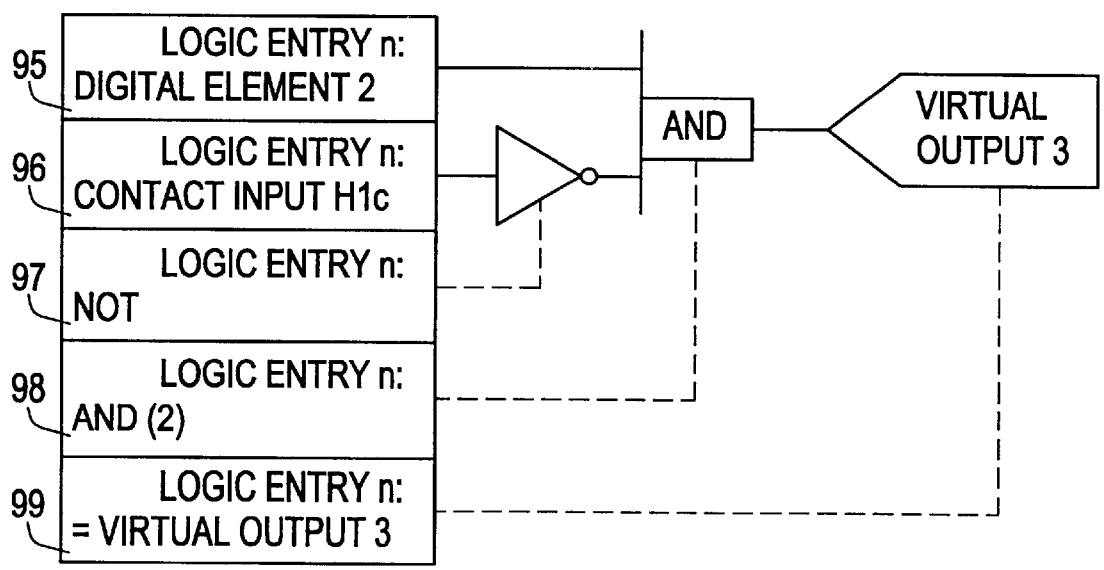
FIG. 8 is a list of parameters resulting from applying the method of FIG. 7 to the example of FIG. 6.

For purposes of illustration, the foregoing example will be translated by identifying the final logic output as parameter 99, and each preceding parameter will be decremented by one in turn. The resulting parameters are shown in FIG. 8. For parameter 99, the final output of the equation is VO3, which is created by the operator "=virtual output n". This parameter is therefore "=VIRTUAL OUTPUT 3". All equations are terminated by this parameter and the total set of required logic is terminated by the operator "END". For parameter 98, the gate preceding the output is an AND, which requires 2 inputs and is therefore designated as AND(2). This 2-input AND gate will operate on the two operands preceding it. These operands are specified in the remaining parameters, as follows. For parameter 97, the lower input to the AND gate is passed through an inverter, as shown in FIG. 6, so this parameter is NOT and will act upon the operand immediately preceding it. Thus, parameter 96 describes the input to the inverter, which in this example is contact input H1c. Parameter 95 defines the other input to the AND gate, which is digital element 2. The resulting logic equation for VO 3 thus consists of parameters 95–99, written in order: DIGITAL ELEMENT 2, CONTACT INPUT H1c, NOT, AND(2), =VIRTUAL OUTPUT 3. A similar process is then used to create a programmable logic equation for VO4. According to an aspect of the present invention, the virtual outputs can be generated from information in both the local and remote devices.

In step 114, the complete programmable logic equation is constructed. Preferably, the equation is assembled in an order where virtual outputs that will be used as inputs to operators are created before they are needed. In most cases, this is not difficult to achieve if, as in the present example, because all of the logic is calculated at least 4 times per power frequency cycle. A set of flexible logic equations is terminated by the "END" operator.

As described above, according to an aspect of the present invention, remote outputs from different protective relays on a peer-to-peer communications network can be combined to greatly enhance the logic control possibilities, and provide virtually unlimited protection and control schemes for the electrical distribution system.

Figure 9:
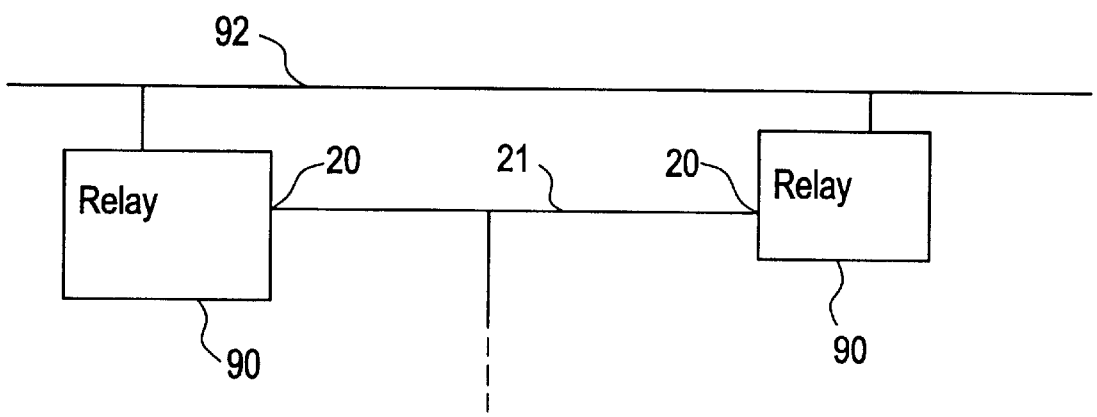
FIG. 9 shows a simplified arrangement of protective relays suitable for implementing the distributed logic scheme of the present invention.

FIG. 9 shows a simplified arrangement of protective relays 90 which are operatively connected to electrical distribution network 92, and which are connected by a communications ports 20 to a peer-to-peer communications network 21. In one implementation of the present invention, each protective relay in the peer-to-peer communications network constantly monitors the communications network for messages. Each message includes an identification of the originating source. If a relay detects a message it requires (e.g., a virtual output from another protective relay), as recognized by the identification of the originating device contained in each message, the relay acts on the message. Each relay is programmed to capture messages only from those originating remote relays which are of interest. This is accomplished by entering the unique identifier associated with each remote relay of interest. In a currently preferred embodiment of the present invention, up to sixteen different remote devices can be programmed for each protective relay.

In addition to including the unique identifier assigned to the originating relay, messages further include the message "hold" time for the device; that is, how long the message is valid.

More particularly, the receiving relay sets a timer assigned to the originating device to the "hold" time interval, and if it has not received another message from this device at the expiration of the interval, the remote device is declared to be non-communicating so it will use the programmed default state for all points from that specific remote device. This mechanism allows a receiving device to fail to detect a single transmission from a remote device which is sending messages at the slowest possible rate, as set by its "default update" timer, without reverting to use of the programmed default states. If a message is received from a remote device prior to the expiration of the "hold" time interval, all points for that device are updated to the states contained in the message and the hold timer is restarted.

The messages further include remote inputs, which can be extracted from the message by the receiving relay, and used by the receiving relay to create operands for the programmable logic equations. Each relay can receive up to, e.g., 32 remote inputs which can be selected from a list of, e.g., 32 DNA bit pairs and 32 UserSt bit pairs. In this example, the function of the UserSt bit pairs is defined by the user selection of the programmable logic operand whose state is represented in a GOOSE message, and the function of the DNA bit pairs is defined by the UCA2.0 specifications as shown in FIG. 10. Each remote input is programmed to replicate the logic state of a specific signal from a specific remote device. This can be programmed by selecting the identifier of the remote device which originates the required signal, selecting the specific required bits of the message, and by selecting the default logic state which will be used by the local relay upon startup, or if the remote relay is non-communicating.

Remote outputs are operands inserted in the network messages which are transmitted to remote relay devices. Each digital point in the message is programmed to carry the state of a particular operand.

Thus, according to the foregoing examples, each protective relay implements a method for providing protective control of a power distribution system in a protective relay. The method can be performed by capturing at least one input message from a peer-to-peer communications network, based at least in part on the identification contained in the message; extracting remote inputs or operands from the input message; executing user-programmable logic equations using the extracted remote inputs or operands to determine whether the protective relay is to perform a protective relay function; and outputting at least one output message to the peer-to-peer communications network, each output message identifying the protective relay and including one or more operands.

It should be appreciated from the foregoing description that by providing for remote inputs and outputs in each protective relay in a network, and by allowing logic equations to be programmed and assigned to local (i.e., inputs and outputs located in an individual relay) physical and virtual inputs and outputs, as well as remote inputs and outputs associated with other protective relays in the network, the present invention allows logic functions to be distributed throughout a protective relay network. This allows almost infinite logic configurations, affording the user significantly greater flexibility in power system protection and control than conventional solutions. This also avoids complex wiring schemes between relays, and avoids the need for large numbers of physical inputs on each protective relay associated with the power distribution system.

While the foregoing description includes numerous details, they are provided for illustrative purposes only, and are not intended to limit the scope of the invention in any way. The specific examples disclosed above can be modified in many ways by those of ordinary skill in the art without departing from the scope and spirit of the invention, as defined by the following claims and their legal equivalents.

What is claimed is:

1. A power control and monitoring system, comprising:
   an electrical power distribution network;
   a plurality of digital protective relays, each digital protective relay associated with one or more points on the electrical power distribution network, and each digital protective relay including a communications port for connection to a peer-to-peer communications network,
   wherein each digital protective relay includes user-programmable logic, and wherein logic inputs and outputs are communicated between the plurality of digital protective relays over the peer-to-peer communications network.

2. The system of claim 1, wherein the peer-to-peer communications network is an ethernet network, and wherein logic input data and logic output data are communicated between the plurality of digital protective relays according to the Electric Power Research Institute UCA 2.0 format.

3. The system of claim 2, wherein logic data is communicated in the form of messages, each message including a unique identifier identifying the protective relay originating the message, and one or more remote inputs for use in the user-programmable logic circuitry.

4. The system of claim 3, wherein the remote inputs are operands for the logic equations.

5. The system of claim 1, wherein the user-programmable logic circuitry uses postfix notation.

6. The system of claim 1, wherein each digital protective relay is programmed to receive messages on the peer-to-peer communications network from certain ones of the plurality of digital protective relays.

7. The system of claim 6, wherein the digital relay is programmed by providing unique identifiers associated with the certain ones of the plurality of digital protective relays to each protective relay.

8. A digital protective relay, comprising:

connection elements for connection to an electrical distribution system;

at least one communication port for connection to a peer-to-peer communication network;

an input for receiving logic instructions from a user; and programmable logic for executing user-supplied logic instructions, wherein network messages containing logic inputs and outputs are communicated between a plurality of digital protective relays over the peer-to-peer communications network.

9. The relay of claim 8, wherein the peer-to-peer communications network is an ethernet network, and wherein the logic inputs and outputs are communicated according to the Electric Power Research Institute (EPRI) UCA 2.0 format.

10. The system of claim 9, wherein logic data is communicated in the form of messages, each message including a unique identifier identifying the protective relay originating the message, and one or more remote inputs or outputs for use in the user-programmable logic circuitry.

11. The system of claim 10, wherein the remote inputs or outputs are operands for the logic equations.

12. The relay of claim 8, wherein the programmable logic is programmable using postfix notation.

13. The relay of claim 8, wherein the relay is programmed to receive messages on the peer-to-peer communications network from certain ones of the plurality of digital protective relays.

14. The relay of claim 13, wherein the relay is programmed by providing unique identifiers associated with the certain ones of the plurality of digital protective relays to each protective relay.

15. A method for providing protective control of a power distribution system in a protective relay, the method comprising:

capturing at least one input message from a peer-to-peer communications network, each input message identifying a remote protective relay;

extracting operands from the at least one message;

executing user-programmable logic equations using the extracted operands to determine whether the protective relay is to perform a protective relay function; and outputting at least one output message to the peer-to-peer communications network, each output message identifying the protective relay and including one or more operands.

16. The method of claim 15, further comprising the step of monitoring the peer-to-peer communications network for messages from particular ones of a plurality of remote protective relays, prior to the step of capturing.

17. The method of claim 15, wherein the peer-to-peer communications network is an ethernet network.

18. The method of claim 15, wherein each message is in the Electric Power Research Institute UCA 2.0 format.

* * * * *